UNITED STATES PATENT OFFICE 2,251,921

AZO COMPOUNDS AND MATERIALS COLORED THEREWITH

Joseph B. Dickey and John R. Byers, Jr., Rochester, N. Y., assignors to Eastman Kodak Company, Rochester, N. Y., a corporation of New Jersey No Drawing. Application January 16, 1940, Serial No. 314,132

11 Claims. (Cl. 260—193)

The present invention relates to azo compounds and to materials colored therewith. More particularly it relates to azo compounds having the general formula:

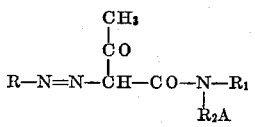

wherein R represents a member selected from the group consisting of a benzene nucleus, and a naphthaline nucleus, $R_1$ represents a member selected from the group consisting of a benzene nucleus, a naphthalene nucleus, a diphenyl nucleus, and an azobenzene nucleus, $R_2$ represents an aliphatic group, and A represents a member selected from the group consisting of a sulfo group, a sulfato group, a phosphito group, and a phosphato group. More specifically $R_2$ represents groups including —$C_2H_4$—, —$C_3H_6$—, —$C_4H_8$—, —$C_{15}H_{30}$—,

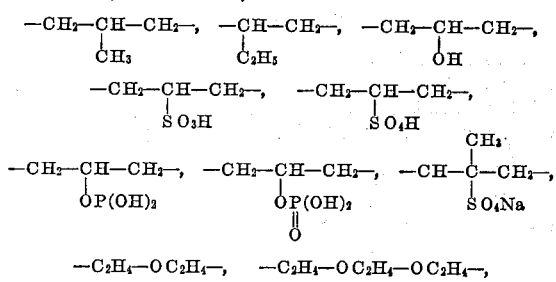

—$C_2H_4$—O$C_2H_4$—, —$C_2H_4$—O$C_2H_4$—O$C_2H_4$—, and the like. A represents more specifically the acid radicals including

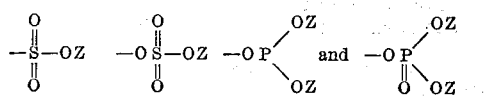

wherein Z represents an alkyl group such as methyl, ethyl, butyl and the like, an aryl group such as a phenyl group or a substituted phenyl group, and an alkali forming metal such as sodium, potassium, calcium, and the like. Furthermore, the nuclei R and $R_1$ may be substituted by one or more monovalent substituents selected from the group of atoms such as chlorine, bromine, fluorine, and radicals such as a hydroxyl group, an amino group, an acetamino group, a methyl group, an ethyl group, a butyl group, a methoxy group, an ethoxy group, a sulfo group, an alkylsulfone group such as a methyl or ethyl sulfone, a nitro group, and other similar kind of radicals.

While our invention is primarily concerned with the monoazo compounds, polyazo compounds are likewise included within the scope of the invention. $R_1$ in the above formula, for example, may be an azobenzene nucleus or a substituted azobenzene nucleus.

We have found that the above described class of azo compounds are excellent dyes which produce on textile materials colors ranging from yellow to orange of excellent fastness to light and high resistance to washing and gaseous oxidation products. It is an object of our invention, therefore, to prepare the azo compounds described and to color organic derivatives of cellulose, silk and wool therewith.

The necessary coupling components may be prepared by treating compounds of the general formula:

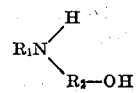

wherein $R_1$ and $R_2$ have the same meanings as previously defined, with ethyl acetoacetate to obtain the corresponding acetoacetarylamides, which may then be condensed in pyridine with sulphuric acid, chlorosulfonic acid, phosphorus trichloride, phosphorus oxychloride, or with a phosphorus halide, substituted or not by alkyl or aryl groups as desired.

The following examples illustrate some of the azo compounds of our invention.

Example 1

1 mole of 2-nitro-4-methylaniline is diazotized with sodium nitrite and added with stirring to a well iced aqueous sodium carbonate solution containing 1 mole of sodium-N-sulfoethyl acetoacetanilide. When the coupling reaction is complete, the mixture is made slightly acid to Congo red indicator with hydrochloric acid and the dye salted out, filtered and dried.

The dye thus obtained has the formula:

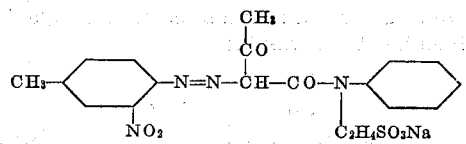

and colors cellulose acetate, silk and wool yellow shades from an aqueous solution which may contain salt.

In place of 2-nitro-4-methylaniline there may be substituted 2-nitro-4-ethylaniline, and 2-nitro-4-butylaniline.

Example 2

1 mole of 2-nitro-4-chloroaniline is diazotized and coupled with 1 mole of 2-methoxy-N-ω-ammonium sulfopropyl-acetoacetanilide following the procedure described in Example 1. The dye thus obtained has the formula:

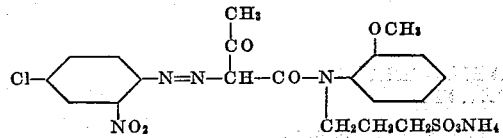

and colors cellulose acetate, silk and wool yellow shades from an aqueous solution which may contain salt.

In place of 2-nitro-4-chloroaniline there may be substituted 2-nitro-4-bromoaniline, and ortho-, meta-, or para-nitroaniline.

Example 3

1 mole of 2-nitro-4-methoxyaniline is diazotized and coupled with 1 mole of 2,5-dichloro-N-γ-sodium sulfo-β-hydroxy-propyl-acetoacetanilide following the procedure described in Example 1. The dye thus obtained has the formula:

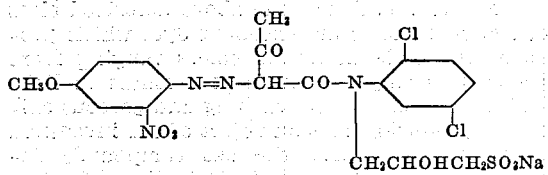

and colors cellulose acetate, silk and wool orange-yellow shades from an aqueous solution which may contain salt.

In place of 2-nitro-4-methoxyanline there may be substituted 2-nitro-4-ethoxyaniline, 2-nitro-4-propoxyaniline, and 2-nitro-4-butoxyaniline.

Example 4

2 moles of 2-nitro-3-isopropyl-6-methylaniline are diazotized and coupled with 1 mole of 4,4'-di-β-sodium sulfoethyl acetoacetamino diphenyl following the procedure described in Example 1. The dye thus obtained has the probable formula:

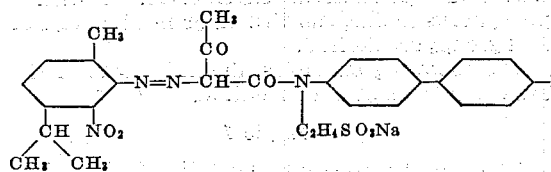

and colors silk and wool yellow shades from an aqueous solution which may contain salt.

Example 5

1 mole of 2-nitroaniline-4-sulfonic acid is diazotized and coupled with 1 mole of 3-methyl-4-(4'-nitrobenzene-azo-)-6-methoxy-N-β-ammonium sulfatoethyl acetoacetanilide following the procedure described in Example 1. The dye thus obtained has the formula:

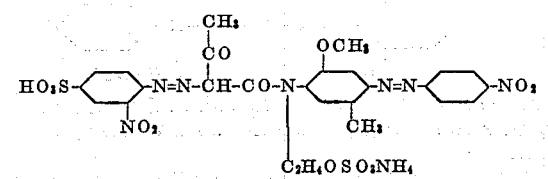

and colors silk and wool orange shades from an aqueous solution which may contain salt.

Example 6

1 mole of 2-nitro-4-hydroxyaniline is diazotized and coupled with 1 mole of 4-dimethylamino-N-ω-phosphitopropyl acetoacetanilide following the procedure described in Example 1. The dye thus obtained has the formula:

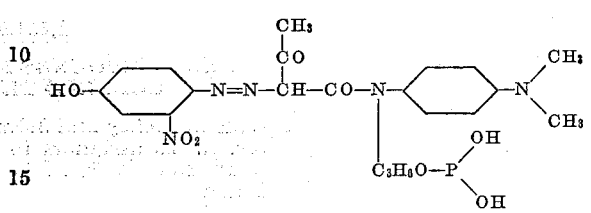

and colors cellulose acetate, silk and wool orange-yellow shades from an aqueous solution which may contain salt.

Example 7

1 mole of 2-nitro-α-naphthylamine is diazotized and coupled with 1 mole of N-(γ-sulfo-β-phosphatopropyl) acetoacetnaphthalide-5-sulfonic acid following the procedure of Example 1. The dye thus obtained has the formula:

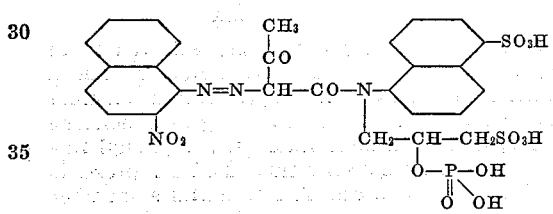

and colors silk and wool orange-yellow shades from an aqueous solution which may contain salt.

Example 8

1 mole of 1-amino-4-nitronaphthalene-5-sulfonic acid is diazotized and coupled with 1 mole of 2,5-dimethoxy-β-sodium methyl phosphatoethel acetoacetanilide following the procedure of

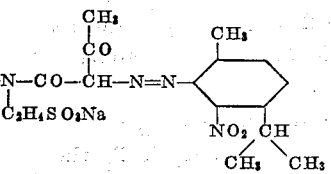

Example 1. The dye compounded thus obtained has the formula:

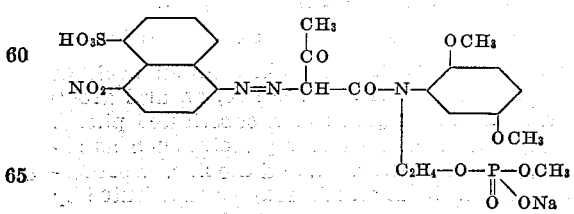

and colors silk and wool orange-yellow shades from an aqueous solution which may contain salt.

Example 9

1 mole of o-amino-phenylmethyl sulfone is diazotized and coupled with 1 mole of 4-acetamino-N-β-ammonium sulfatoethyl acetoacetanilide following the procedure described in Example 1. The resulting dye has the formula:

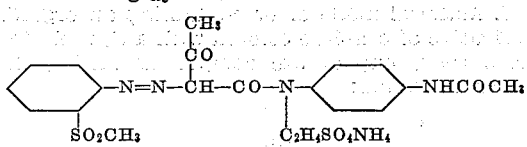

and colors cellulose acetate, silk and wool yellow shades from an aqueous suspension of the dye. In place of 4-acetamino-N-β-ammonium sulfatoethyl acetoacetanilide there may be substituted any of the coupling components disclosed in the preceding examples, the dyes resulting therefrom coloring textile materials yellow to orange shades.

Example 10

1 mole of 2-nitro-4-methylsulfone aniline is diazotized and coupled with 1 mole of 2-nitro-4-methoxy-N-disodium phosphatoethyl acetoacetanilide following the procedure described in Example 1. The resulting dye has the formula:

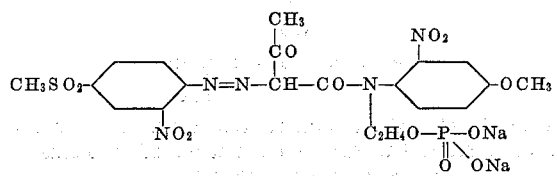

and colors cellulose acetate, silk and wool orange-yellow shades from an aqueous solution which may contain salt.

In place of 2-nitro-4-methylsulfone aniline there may be substituted other 2-nitro-4-alkylsulfone anilines such as 2-nitro-4-ethylsulfone aniline, 2-nitro-4-cetylsulfone aniline, and the like.

Example 11

1 mole of o-anisidine is diazotized and coupled with 1 mole of 2-methoxy-N-glyceryl acetoacetanilide following the procedure of Example 1. The resulting dye has the formula:

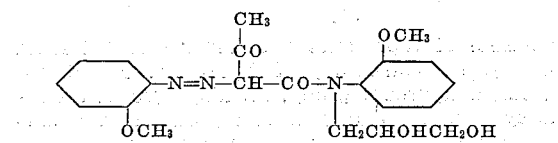

and colors cellulose acetate yellow shades from an aqueous suspension of the dye. The above azo compound may then be converted to the acid derivatives by condensation with sulphuric acid, chlorosulfonic acid, phosphorus trichloride, phosphorus oxychloride, or with phosphorus halide compounds substituted by alkyl or aryl groups as desired. Either or both hydroxyls may be converted to the acid derivatives.

Example 12

1 mole of p-nitro-o-anisidine is diazotized and coupled with 1 mole of 2-acetamino-N-ammonium sulfatopropyl acetoacetanilide following the procedure of Example 1. The azo dye compound obtained has the formula:

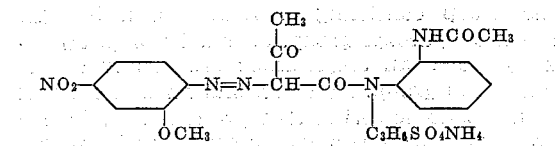

and colors cellulose acetate, silk and wool yellow shades from an aqueous solution of the dye which may contain salt.

Example 13

1 mole of p-diethylamino-m-nitroaniline is diazotized and coupled with 1 mole of 2,5-dichloro-N-sodium sulfo ethoxy-ethoxyethyl acetoacetanilide following the procedure of Example 1. The azo dye compound obtained has the formula:

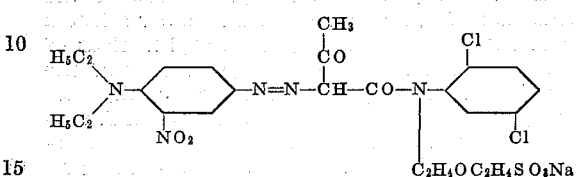

and colors cellulose acetate, silk and wool orange shades from an aqueous solution of the dye.

Since most of the azo compounds of the invention are water-soluble they will ordinarily be applied to textile materials such as artificial silks, wool and natural silk directly from their aqueous solutions containing salt without the necessity of employing a dispersing or solubilizing agent. For a more detailed description as to how the water-soluble members of the invention may be employed, reference may be had to McNally & Dickey U. S. Patent No. 2,107,898, issued Feb. 8, 1938. Where the particular dye is insoluble or only partly soluble, it is necessary to prepare a suspension by grinding the dye to a paste with a dispersing agent such as a soap, a sulfonated oil, or a higher fatty acid glyceryl sulfate and dispersing this paste in a suitable quantity of water. The material to be colored is immersed in the dispersion starting with a bath temperature of about 45–55° C., which is then gradually raised to 80–85° C., at which point the material is worked for several hours. Salt may be added to facilitate exhaustion of the dye bath during the dyeing operation. When the material has acquired the desired shade or condition of color, it is removed from the bath, washed with soap, rinsed and dried.

While our invention is illustrated more particularly in connection with cellulose acetate, silk and wool, it will be understood that the azo compounds above described are by no means limited exclusively to the specific materials named, but are likewise applicable to textile materials in general, including vegetable fibers such as cotton, as well as other organic derivatives of cellulose such as hydrolyzed and unhydrolyzed organic acid esters of cellulose or mixed organic acid esters of cellulose including cellulose formate, cellulose propionate, cellulose butyrate, cellulose acetate-propionate, cellulose acetate-butyrate, and cellulose ethers including methyl cellulose, ethyl cellulose, and benzyl cellulose.

We claim:

1. The azo compounds having the general formula:

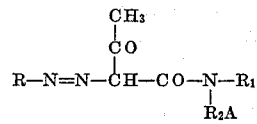

wherein R and $R_1$ each represents a member selected from the group consisting of a benzene nucleus, and a naphthalene nucleus, $R_2$ represents an aliphatic group of at least two carbon atoms, and A represents a member selected from the group consisting of a sulfo group, a sulfato group, and an acid ester of phosphorus group.

2. The azo compounds having the general formula:

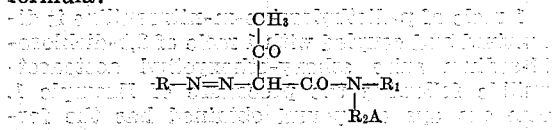

wherein R represents an aryl nucleus of the benzene series, $R_1$ represents a member selected from the group consisting of an aryl nucleus of the benzene series, and an aryl nucleus of the naphthalene series, $R_2$ represents an aliphatic group of at least two carbon atoms, and A represents a member selected from the group consisting of a sulfo group, a sulfato group, and an acid ester of phosphorus group.

3. The azo compounds having the general formula:

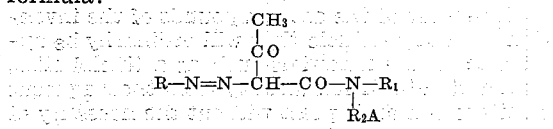

wherein R and $R_1$ each represents an aryl nucleus of the benzene series, $R_2$ represents an aliphatic group of at least two carbon atoms, and A represents a member selected from the group consisting of a sulfo group, a sulfato group, and an acid ester of phosphorus group.

4. The azo compounds having the general formula:

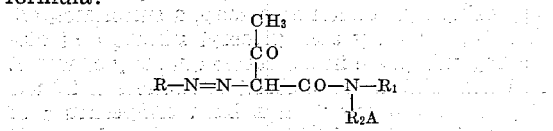

wherein R and $R_1$ each represents an aryl nucleus of the benzene series, $R_2$ represents an alkylene group of at least two carbon atoms, and A represents a member selected from the group consisting of a sulfo group, a sulfato group, and an acid ester of phosphorus group.

5. The azo compounds having the general formula:

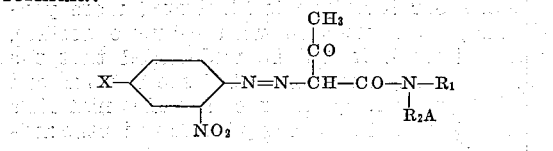

wherein X represents a member selected from the group consisting of hydrogen, a halogen atom, a hydroxyl group, an alkyl group, an alkoxy group, an alkylsulfone group, and a sulfonic acid group, $R_1$ represents an aryl nucleus of the benzene series, $R_2$ represents an alkylene group of at least two carbon atoms, and A represents a member selected from the group consisting of a sulfo group, a sulfato group, and an acid ester of phosphorus group.

6. A textile material selected from the group consisting of an organic derivative of cellulose, silk and wool colored with a dye selected from the group of azo compounds having the general formula:

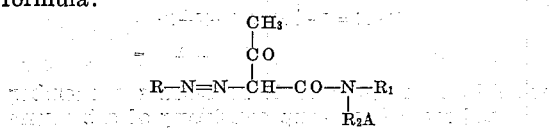

wherein R and $R_1$ each represents a member selected from the group consisting of a benzene nucleus, and a naphthalene nucleus, $R_2$ represents an aliphatic group of at least two carbon atoms, and A represents a member selected from the group consisting of a sulfo group, a sulfato group, and an acid ester of phosphorus group.

7. Material made of or containing an organic derivative of cellulose colored with a dye selected from the group of azo compounds having the general formula:

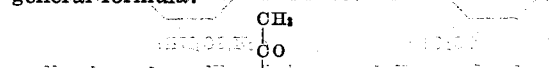

wherein R and $R_1$ each represents a member selected from the group consisting of a benzene nucleus, and a naphthalene nucleus, $R_2$ represents an aliphatic group of at least two carbon atoms, and A represents a member selected from the group consisting of a sulfo group, a sulfato group, and an acid ester of phosphorus group.

8. Material made of or containing cellulose acetate colored with a dye selected from the group of azo compounds having the general formula:

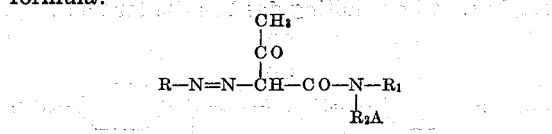

wherein R and $R_1$ each represents a member selected from the group consisting of a benzene nucleus, and a naphthalene nucleus, $R_2$ represents an aliphatic group of at least two carbon atoms, and A represents a member selected from the group consisting of a sulfo group, a sulfato group, and an acid ester of phosphorus group.

9. A textile material selected from the group consisting of an organic derivative of cellulose, silk and wool colored with a dye selected from the group of azo compounds having the general formula:

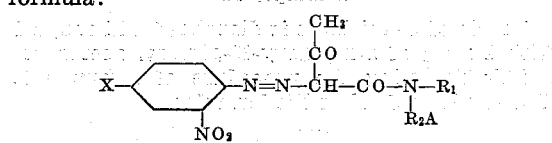

wherein X represents a member selected from the group consisting of hydrogen, a halogen atom, a hydroxyl group, an alkyl group, an alkoxy group, an alkylsulfone group, and a sulfonic acid group, $R_1$ represents an aryl nucleus of the benzene series, $R_2$ represents an alkylene group of at least two carbon atoms, and A represents a member selected from the group consisting of a sulfo group, a sulfato group, and an acid ester of phosphorus group.

10. Material made of or containing an organic derivative of cellulose colored with a dye selected from the group of azo compounds having the general formula:

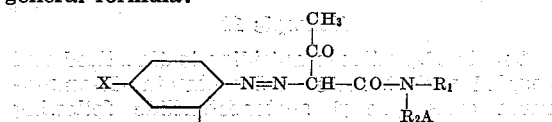

wherein X represents a member selected from the group consisting of hydrogen, a halogen atom, a hydroxyl group, an alkyl group, an alkoxy group, an alkylsulfone group, and a sulfonic acid group, $R_1$ represents an aryl nucleus of the benzene series, $R_2$ represents an alkylene group of at least two carbon atoms, and A represents a member selected from the group consisting of a sulfo group, a sulfato group, and an acid ester of phosphorus group.

11. Material made of or containing cellulose acetate colored with a dye selected from the group of azo compounds having the general formula:

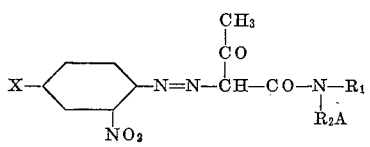

wherein X represents a member selected from the group consisting of hydrogen, a halogen atom, a hydroxyl group, an alkyl group, an alkoxy group, an alkylsulfone group, and a sulfonic acid group, $R_1$ represents an aryl nucleus of the benzene series, $R_2$ represents an alkylene group of at least two carbon atoms, and A represents a member selected from the group consisting of a sulfo group, a sulfato group, and an acid ester of phosphorus group.

JOSEPH B. DICKEY.
JOHN R. BYERS, Jr.